United States Patent [19]

Meyering et al.

[11] Patent Number: 5,707,047
[45] Date of Patent: Jan. 13, 1998

[54] ENGINE MOUNT FOR MOTOR VEHICLES

[75] Inventors: Frank Meyering, Lohne; Rüdiger Sprang, Ostercappeln, both of Germany

[73] Assignee: Lemförder Metallwaren AG, Lemförde, Germany

[21] Appl. No.: 536,644

[22] Filed: Sep. 29, 1995

[30] Foreign Application Priority Data

Oct. 1, 1994 [DE] Germany ............ 44 35 27.9

[51] Int. Cl.⁶ ................ F16F 5/00; F16F 9/00
[52] U.S. Cl. .................... 267/140.13; 267/219
[58] Field of Search ............... 267/140.13, 141, 267/141.2, 219, 220; 248/562, 636

[56] References Cited

U.S. PATENT DOCUMENTS

| | | | |
|---|---|---|---|
| 4,647,023 | 3/1987 | Ray et al. | 267/219 |
| 4,657,232 | 4/1987 | West | 267/140.13 |
| 4,666,137 | 5/1987 | Hamaekera et al. | 267/140.13 |
| 4,796,875 | 1/1989 | Mertens et al. | 267/140.13 |
| 4,938,463 | 7/1990 | Miyamoto et al. | 267/219 X |
| 5,139,240 | 8/1992 | Miyamoto et al. | 257/140.13 |

FOREIGN PATENT DOCUMENTS

3225700C1  11/1983  Germany.

*Primary Examiner*—Lee W. Young
*Attorney, Agent, or Firm*—McGlew and Tuttle

[57] ABSTRACT

An engine mount with hydraulic damping for motor vehicles, which has at least two chambers, which are provided with at least partially elastically deformable walls in a housing and are filled with a damping fluid, and a common wall of the chambers with a valve plate, in which a cage with a decoupling diaphragm made of an elastically deformable material arranged in it is provided. This decoupling diaphragm includes a round disk with constant cross section and is arranged in the cage without axial clearance, at right angles to the common chamber. The openings of the cage have a cross section tapering in the outward direction from the decoupling diaphragm due to oblique limiting surfaces.

8 Claims, 2 Drawing Sheets

ENGINE MOUNT FOR MOTOR VEHICLES

FIELD OF THE INVENTION

The present invention pertains to an engine mount with hydraulic damping for motor vehicles, which has at least two chambers, which are provided with at least partially elastically deformable walls in a housing and are filled with a damping fluid, and a common wall of the two chambers with a valve plate, in which a cage with a decoupling diaphragm made of an elastically deformable material is provided.

BACKGROUND OF THE INVENTION

Such an engine mount has been known from DE 32 25 700 C1. The two chambers are arranged in a horizontally divided housing under a spring element absorbing the static loads. A valve plate consisting of two disks forms the common wall between the two chambers filled with the damping fluid. A throttle channel connecting the two chambers to one another extends horizontally in the valve plate, and a decoupling diaphragm made of an elastically deformable material is additionally arranged with an axial clearance of motion in a cage of the two disks. Vibrations of high amplitude are damped according to the principle of action of such engine mounts by the displacement of damping fluid from one chamber into the other chamber during inward deflection and by the return of the damping fluid during outward deflection. The geometry of the throttle channel in the valve plate is defined in a function-dependent manner for this purpose. Vibrations of smaller amplitude are decoupled by the decoupling diaphragm, which is movable with an axial motion between the cage walls forming the support grid, so that it is able to vibrate to and fro in the space between the support grids in the case of vibrations of smaller amplitude in order to thus bring about a pressure equalization between the two chambers in the area of this range of motion, without fluid being displaced from one chamber into the other chamber via the throttling channel. The decoupling diaphragm is consequently freely movable at low amplitude in the acoustically relevant range. As a result, undesired rattling noise and even a great reduction in damping may occur at high amplitudes. The decoupling diaphragm is supported by the cage at high amplitudes, so that the passage is hydraulically closed in the area of the decoupling diaphragm.

SUMMARY AND OBJECT OF THE INVENTION

The object of the present invention is to prevent noises from being generated in the engine mounts during vibrations of low amplitude with a decoupling diaphragm which can be manufactured at a low cost and by a special design of the cage.

According to the invention, an engine mount with hydraulic damping for motor vehicles is provided including at least two chambers each with at least partially elastically deformable walls. The chambers are formed in a housing and are filled with a damping fluid. A common wall of the chambers is provided with a valve plate. The valve plate includes a cage with a decoupling diaphragm made of an elastically deformable material. The decoupling diaphragm is arranged in the cage. The decoupling diaphragm is designed as a disk with a substantially constant cross section. The decoupling diaphragm is disposed within the cage substantially without axial clearance at a right angle to the common chamber wall. The cage is provided with openings which have a cross section which tapers in an outward direction from the decoupling diaphragm, due to oblique limiting surfaces.

The edge of the decoupling diaphragm is preferably inserted radially movably with a soft axial pretension or biasing force into a recess defined between the two disks of the valve plate. These two disks cooperate to form the cage. The cage openings are preferably arranged symmetrically and are provided with a conical depression on the side facing the decoupling diaphragm.

According to this solution, a rubber disk designed with substantially constant cross section forms the decoupling diaphragm, and this rubber disk is arranged in the cage without axial clearance from the common chamber wall. In the range of action of vibrations of low amplitude, this rubber disk bulges into the openings of the cage, which are limited by oblique wall surfaces. A sudden impact of the decoupling diaphragm being deformed on opposing surfaces is avoided, so that rattling noises can no longer be generated, either. In a preferred embodiment of the object of the present invention, the edge of the decoupling diaphragm is inserted radially movably with a slight biasing force in the recess between the two disks of the valve plate, so that the rubber disk forming the decoupling diaphragm can shrink radially toward the center during bulging into the openings of the cage walls and it is thus pulled out of the soft edge clamping. After load relief, the edge of the rubber disk is automatically pushed back in the outward direction into the soft clamped position due to the intrinsic viscosity of the material of the rubber disk. As a result, there is a slight frictional damping in the radial direction during the immersion of the decoupling diaphragm into the conical depression of the openings, but only to the extent that the decoupling diaphragm can again return to its original diameter in its neutral central position, after which it immerses into the depression of the opening on the opposite side.

In a preferred embodiment of the features of the present invention, the openings of the cage are arranged symmetrically and are designed as holes with a conic depression portion on the side facing the decoupling diaphragm. Such a design fulfills the action desired by the present invention and makes manufacture at a low cost possible. The cone obtained by means of the depression should preferably be designed such that the volume of fluid displaced at the amplitude to be decoupled can be taken up in the bulges being formed above the diaphragm, and the cone entry diameter is selected to be such that the overall rigidity of the diaphragm is adjusted to the permissible dynamic hardening of the mount.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
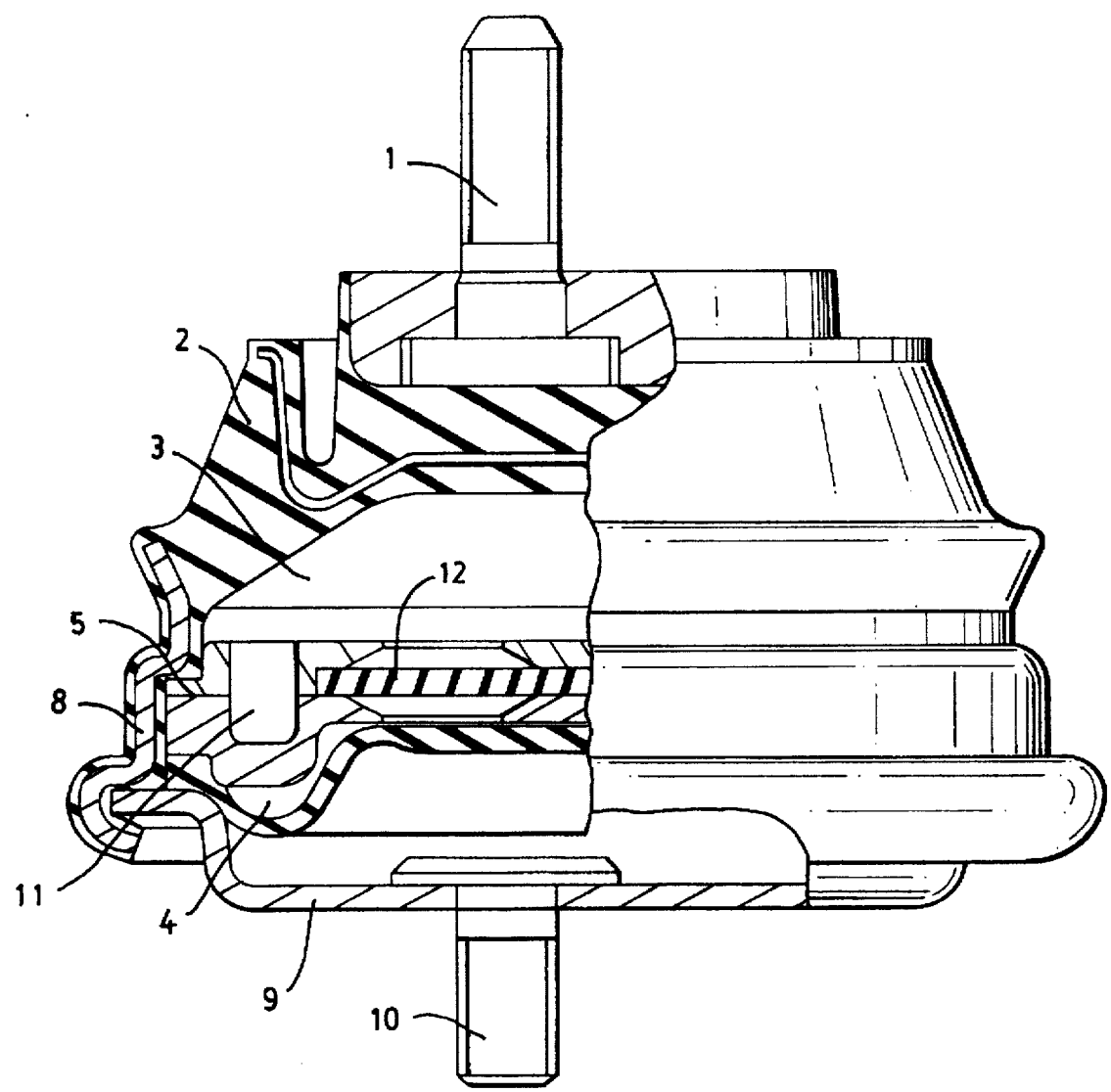
FIG. 1 is an engine mount, half as a front view and half as a vertical section in an axial plane.
Figure 3:
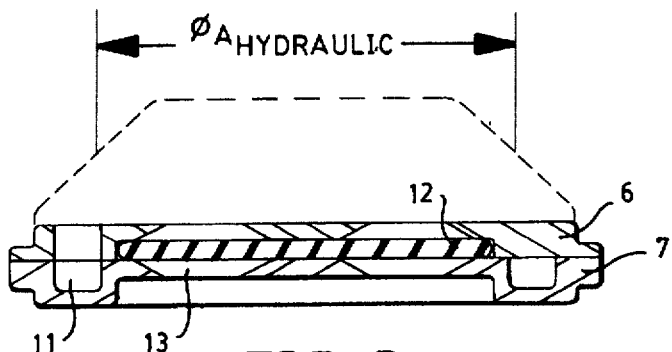
FIG. 3 is a section along line III—III in FIG. 2.
Figure 4:
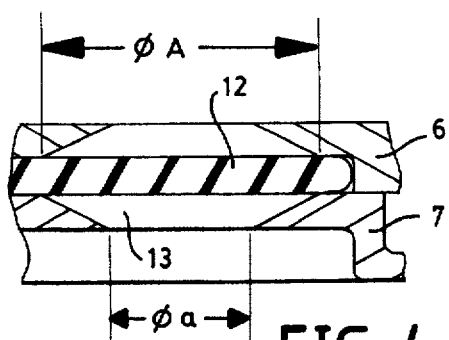
FIG. 4 is a view of detail X with the decoupling diaphragm released.
Figure 2:
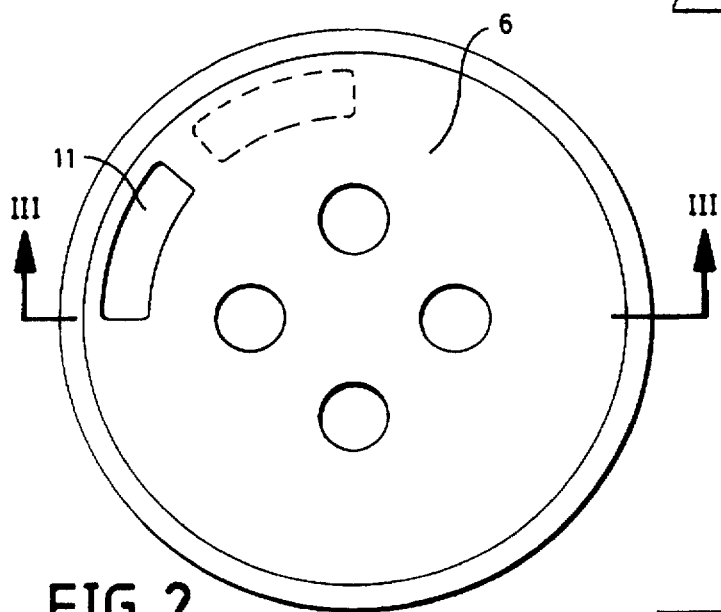
FIG. 2 is a top view of a valve plate.
Figure 5:
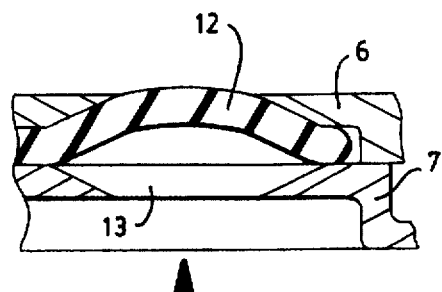
FIG. 5 is a view of detail X with the decoupling diaphragm bulging out.

Two chambers 3 and 4 filled with a damping fluid, which are clamped at the edge by a valve plate 5 comprised of two jointly tensioned disks 6 and 7, are arranged in the engine mount under a spring body 2 provided with a fastening pin 1. An upper housing part 8 and a lower housing part 9 are rigidly connected to one another at the edge. The lower housing part 9 has an additional fastening pin 10. A throttling channel 11, which connects the two chambers 3 and 4 to one another and makes possible an alternate equalization of fluid between the two chambers 3 and 4 during vibrations of a high amplitude, is located in the valve plate 5 consisting of the two disks 6 and 7. A cage, which accommodates a decoupling diaphragm 12 made of an elastically deformable material, e.g., rubber, is formed between the two disks 6 and 7 due to the geometric design of the two disks 6 and 7. The decoupling diaphragm 12 is placed with its edge into a recess between the two disks 6 and 7 with a soft biasing force prestressing in the axial direction, so that it can be pulled out of this clamped position radially in the inward direction and can again be pushed in as a consequence of the elasticity of its material during deformations and overcome the friction caused by the axial force. The two disks 6 and 7 forming the cage for the decoupling diaphragm 12 have, based on the stress distribution in the decoupling diaphragm 12, at least three openings 13 each with a cross section tapering in the outward direction from the decoupling diaphragm due to oblique limiting surfaces. Holes with a conical depression are preferably provided on the side facing the decoupling diaphragm 12, as is shown in the drawing FIGS. 1, 3, 4 and 5. It can be achieved by a corresponding profiling of the holes that the volume of fluid displaced at the amplitude to be decoupled can be absorbed in the bulges being formed above the decoupling diaphragm, the entry diameter of the hole being selected such that the overall rigidity of the decoupling diaphragm is adjusted to the permissible dynamic hardening of the mount. The overall surface obtained from the entry diameter and the number of holes equals $$A = 0.6 - 0.3 \times A_{hydraulic}$$

wherein the ratio of the entry cross section to the outlet cross section is preferably $$a = 0.5 - 0.25 \times A.$$

Here,

A = hole cross section, $A_{hydraulic}$ = hydraulic effective surface.

This leads to an inclination of about 45° of the depression. The hardness of the material of the decoupling diaphragm 12 is to be adapted based on the selected geometry of the cone.

While a specific embodiment of the invention has been shown and described in detail to illustrate the application of the principles of the invention, it will be understood that the invention may be embodied otherwise without departing from such principles.

What is claimed is:

1. An engine mount for motor vehicles, comprising a housing defining a hydraulic damping system including at least two chambers, said chambers have at least partially elastically deformable walls; damping fluid disposed in said chambers; a common wall in common to the at least two chambers, said common wall including a valve plate with a cage and a decoupling diaphragm formed of an elastically deformable material, arranged in said cage, said decoupling diaphragm being formed of a disk with a substantially constant cross section, said disk being disposed in said cage substantially without axial clearance, at a right angle to said common chamber wall, said cage having openings with a cross section tapering in an outward direction from said decoupling diaphragm, said tapering being formed by oblique limiting surfaces, said decoupling diaphragm having an edge inserted radially movable with a soft axial biasing force between two disks of said valve plate, said valve plate disks define said cage.

2. An engine mount according to claim 1, wherein said cage openings are arranged symmetrically and are shaped as a conical depression on a side facing said decoupling diaphragm.

3. A vibration damping mount comprising:

a housing having deformable outer walls and defining an interior space:

a chamber wall positioned inside said housing and dividing said interior space into first and second chambers, said chamber wall including a cage and a diaphragm positioned inside said cage without substantial axial clearance, said diaphragm being formed of elastically deformable material, said cage defining tapered openings expanding from said first and second chambers toward said diaphragm, an outer edge of said diaphragm being radially movable with respect to said cage.

4. A mount in accordance with claim 3, wherein:

first and second plates have means for clamping said diaphragm between each other with a clamping force to form said cage, said clamping force being of a magnitude to hold said diaphragm radially movable.

5. A mount in accordance with claim 4, wherein:

said magnitude of said clamping force causes movement of said diaphragm from between said plate and into said tapered openings to form a bulge when pressure in one of said chambers is larger than another of said chambers.

6. A mount in accordance with claim 4, wherein:

said magnitude of said damping force causes movement of said diaphragm from a bulge in said tapered openings to between said plates when pressure in said chambers becomes equalized.

7. A mount in accordance with claim 5, wherein:

said tapered openings are of a shape to support said bulge; said clamping force causes a radial friction on said diaphragm during radial movements of said diaphragm.

8. A mount in accordance with claim 3, wherein:

said diaphragm has a substantially constant cross section; damping fluid is located inside said housing; said chamber wall includes a valve plate; said tapered opening are larger adjacent said diaphragm and smaller away from said diaphragm.

* * * * *